Jan. 23, 1968    R. R. HAGER ETAL    3,364,818
HAND AND/OR FOOT OPERATED POWER BRAKE MEANS
Filed Aug. 29, 1966    3 Sheets-Sheet 3
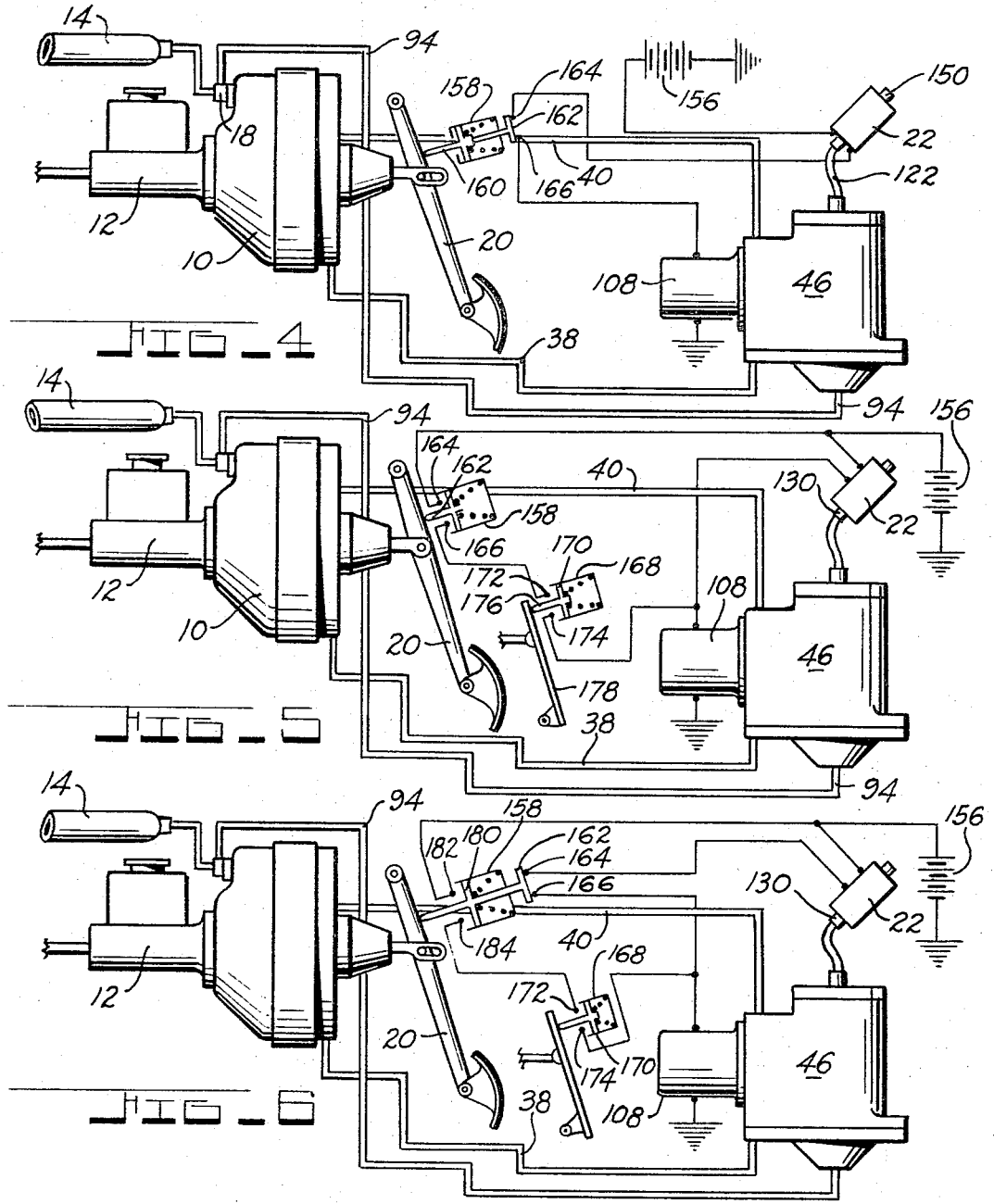
ROBERT R. HAGER
THOMAS M. JULOW
INVENTORS.
BY Richard S. Geib
ATTORNEY.

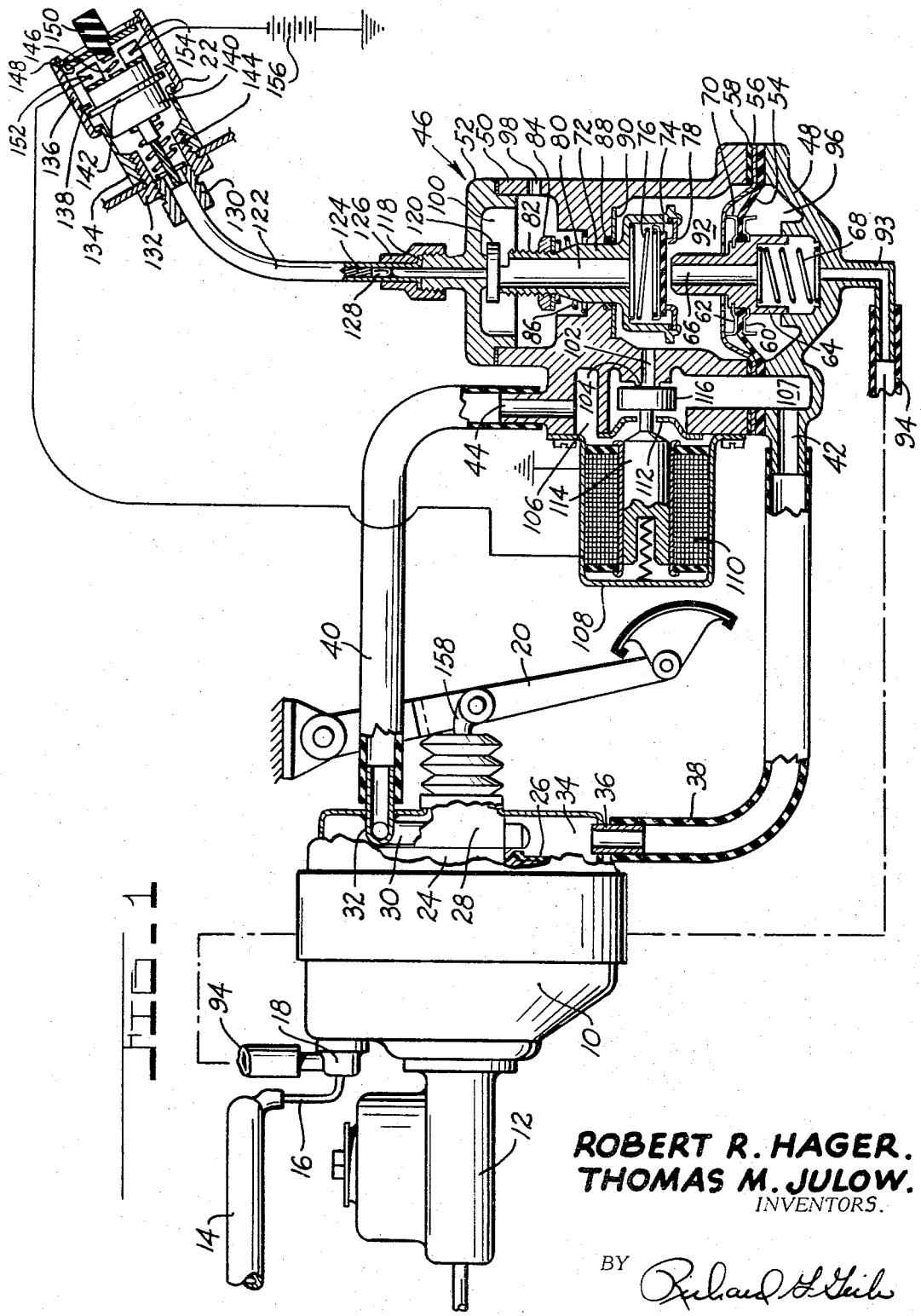

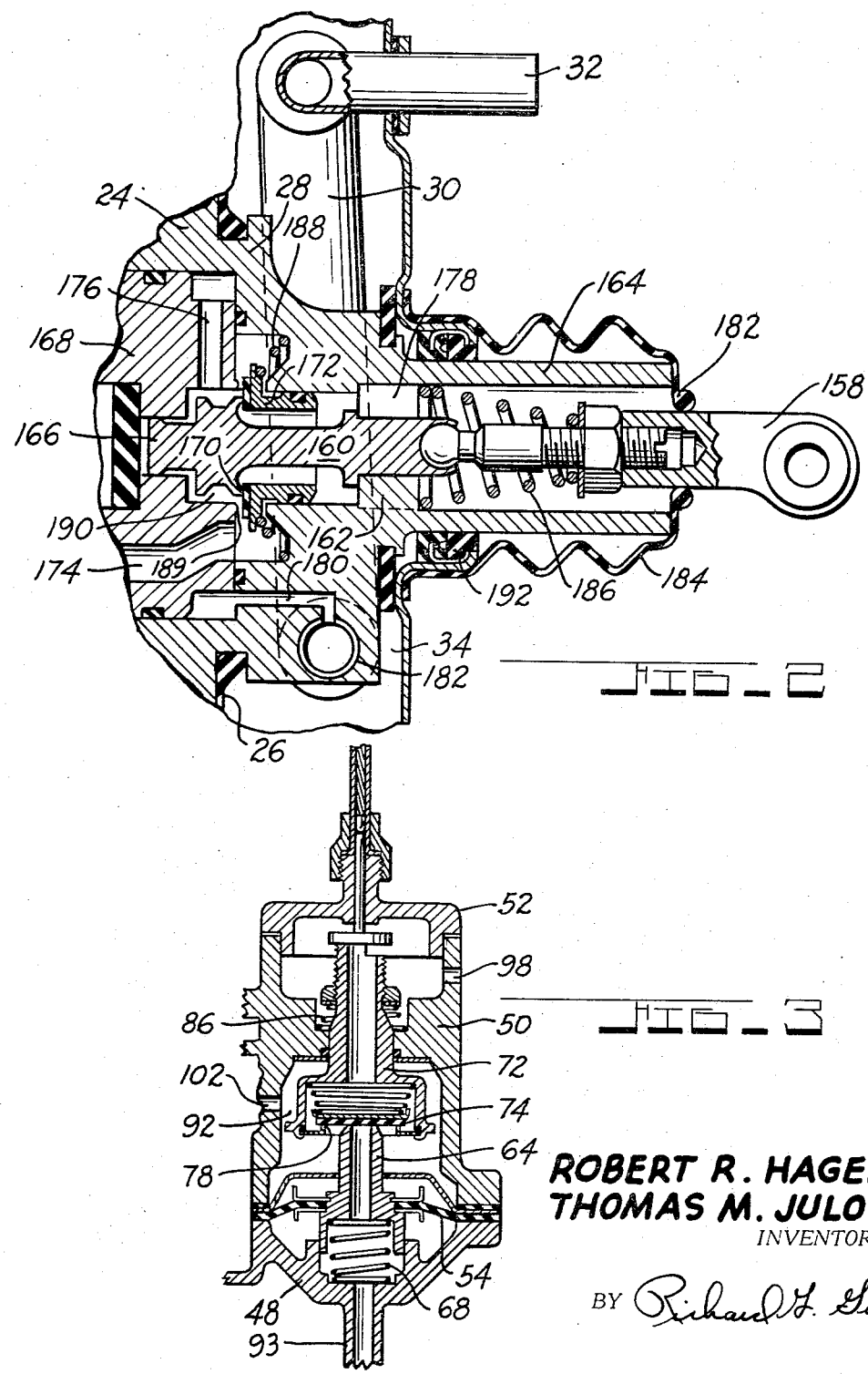

United States Patent Office 3,364,818
Patented Jan. 23, 1968

3,364,818
HAND AND/OR FOOT OPERATED POWER BRAKE MEANS
Robert R. Hager and Thomas M. Julow, South Bend, Ind., assignors to The Bendix Corporation, a corporation of Delaware
Filed Aug. 29, 1966, Ser. No. 575,639
12 Claims. (Cl. 91—24)

ABSTRACT OF THE DISCLOSURE

A dual control means for a fluid pressure servomotor comprising an integral control valve for the servomotor that is operative by a pedal or the like and in series connection with another control valve remotely located with respect to the servomotor that is operative by a completely separate and distinct means than that which is operative of the control valve integral with the servomotor.

---

This invention relates particularly to a means to operate a fluid pressure servomotor from one or more remote operator-operated contol devices.

While the invention is to be more particularly described with reference to fluid pressure servomotors utilized in power braking of vehicles, it should be realized that it is equally adaptable to any fluid pressure servomotor system. The reason for the particular embodiment referencing a power braking system is that it has been realized that under normal driving conditions with the usual motor vehicle on long trips or in congested traffic, it is necessary for an operator to shift his foot from the accelerator pedal to the brake pedal and vice versa many times, which is tiresome, both physically and mentally. Furthermore, it has been realized that with certain physical handicaps, it is difficult, if not impossible, for a person to own and operate an automobile without extensive modifications to the vehicular control systems after its purchase. It is therefore a principal object of this invention to provide a means to operate a fluid pressure servomotor, such as is attendant to power braking systems, by both an operator's hand and/or his foot in order to eliminate the problems aforementioned, as well as others.

Hand operated attachments for actuating foot operated vehicular controls have been proposed, for example, as shown in U.S. Patents Nos. 2,185,170, 2,318,258, 2,416,222, 2,539,994, 2,563,339, 2,669,329, 2,792,082, 2,899,835, 2,931,179, 2,931,181, 2,964,965, 3,168,353. However, these systems have generally been along the line of installing linkage between a vehicle brake pedal, or the like, and a hand operated button, lever, etc. It has also been noted that some of the latter of these references deal with the suggestion of incorporating control valves in parallel arrangement, one of which is operated by a brake pedal and the other of which is operated by a mechanism attached to the steering wheel of the vehicle for control by the hands of the vehicle operator. These later references have added what is considered an undue complexity to the power braking system, and it is another principal object of this invention to provide a more practical and simpler approach for such dual control apparatus.

It is a more particular object of this invention to provide a fluid pressure servomotor having an integral control valve operated by a pedal or the like with a hand control valve in series with the integral control valve of the servomotor.

It is yet another and broader object of this invention to provide a fluid pressure servomotor control system with a means to provide a dual control mechanism which has a primary control member and a secondary control member that are interrelated.

It is still another object of this invention to provide a safety feature in the operation of the fluid pressure servomotor which will energize the servomotor whenever simultaneous pressure is being applied to controlled elements within a vehicle calling for opposing functions of the vehicle.

Other and more specific objects will be observed from the following description of the drawings in which:

FIGURE 1 is a schematic arrangement of a power braking system in accordance with the principles of my invention having the servomotor shown in partial cross section and the hand control valve and remote operating means fully cross sectioned to show their inner details;

FIGURE 2 is a partial cross sectional view of the valving within the servomotor;

FIGURE 3 is a partial cross sectional showing of the hand control valve of FIGURE 1 with the inner parts arranged in a slightly different manner in accordance with the principles of this invention;

FIGURE 4 is a schematic diagram of a modification to the power braking system of FIGURE 1 in accordance with the principles of this invention;

FIGURE 5 is another schematic presentation of still another modification of a power braking system in accordance with the principles of this invention; and FIGURE 6 is a schematic arrangement of a still further modification of a power braking system in accordance with the principles of this invention.

With reference now to FIGURE 1 there is shown a braking system comprising a pneumatic type servomotor 10 for operating a hydraulic master cylinder 12. The pneumatic servomotor is of the type that is normally suspended by a vacuum received from an engine intake manifold 14 communicated by means of a conduit 16 to a vacuum check valve 18 to provide a check vacuum supply for the servomotor 10.

In accordance with the principles of the invention the servomotor 10 is operable by not only a brake pedal 20 but a hand control means 22, as well. The servomotor is constructed to have at least one movable wall 24 operatively arranged in the servomotor which in a preferred embodiment is shown to include a diaphragm 26 that is connected to the servomotor housing and the movable wall, as may be readily familiar to those skilled in the art. The wall 24 is provided with a rearwardly extending boss 28 that is connected by means of a hose 30 to a fitting 32 terminating exteriorly of the housing for the servomotor 10. The diaphragm 26 divides the interior of the servomotor 10 into variable volume chambers, one of which, as at 34, being the control chamber, is shown. A fitting 36 is provided through the rear housing of the servomotor 10 to communicate a conduit 38 to the control chamber 34; whereas a conduit 40 is connected to the fitting 32.

As seen in FIGURE 1, the conduits 38 and 40 connect, respectively, to an outlet port 42 and a control port 44 of a valve 46. This valve 46 is constructed by joining housing sections 48, 50 and 52 together. However, prior to the joining of the housing portions 48 and 50 together a diaphragm 54, and more particularly the peripheral portions of same are placed along with a stop plate 56 and a seal 58 between the flanges of the portions 48 and 50, which flanges are thereafter bolted together. The diaphragm 54 is provided with a central opening. A pair of diaphragm retainer plates 60 and 62 join the diaphragm 54 to a valve plunger 64. The plunger 64 is provided with an internal passage 66 for communicating one side of the diaphragm 54 to the other side of the diaphragm so long as the passage 66 is open. The plunger 64 is biased upwardly from the housing portion 48 by means of a spring 68 which is normally installed in a preloaded condition so that the plunger 64 is urged upwardly, as aforementioned, until upwardly turned flanges 70 on the diaphragm retainer 62 abut the stop plate 56.

The intermediate portion 50 of the housing for the valve 46 is provided with a central opening through which a valve plunger 72 is slidably mounted. As seen, the valve plunger 72 includes a valve poppet 74 biased by a spring 76 onto a valve seat 78. A passage 80 leads from one end of the plunger 72 to the area immediately behind the poppet 74. The plunger is threaded as at 82 and a nut 84 is thereby assembled to the plunger for the purpose of locating the plunger 72 within the intermediate portion 50. This is done by placing a spring 86 between the nut and the portion 50 and rotating the nut 84 to compress the spring 86 and normally position the plunger 72 in the attitude of FIGURE 1. A seal 88 is held by a snap ring 90 about the sliding fit of the plunger 72 with the housing portion 50. Therefore, there is formed between the diaphragm 54 and the seal 88 a control chamber 92 in the intermediate housing portion 50.

The housing portion 48 is open to a control pressure inlet by means of an inlet port 93 that in the system shown by FIGURE 1 communicates with a conduit 94 leading to the check valve 18 so that a check vacuum supply is always available to a variable volume chamber 96 in the housing portion 48. At the upper extremity of the intermediate housing portion 50, as seen in FIGURE 1, there is provided an atmospheric air inlet 98 for an atmospheric chamber 100 that is located between the housing portion 50 and 52. As seen, the chamber 96 is open to the passageway 66 in the plunger 64, and the chamber 100 is open to the passageway 80 in the plunger 72.

The control pressure chamber 92 communicates with a passageway 102 formed in the intermediate housing portion 50. The housing portion 50 is also provided with an annular valve seat 104 about the passageway 102 as it opens into a chamber 106 formed in the left side of the intermediate housing portion 50. It should be noted, that the housing portion 48 is provided with a passage 107 that is open to the chamber 106 and to the outlet port 42 via appropriate openings through the diaphragm 54, the plate 56, and the seal 58 at the juncture of the housing portion 48 with the housing portion 50.

The chamber 106 of the intermediate housing portion 50 is closed by means of a housing 108 for a solenoid coil 110 that is provided with a plate 112 having a central opening in axial alignment with the passageway 102. The solenoid coil 110 controls a spring biased plunger 114 to which is affixed a disc valve 116 for reciprocation between the valve seat 104 and the plate 112 to control the passage 102 and the opening in the plate 112, respectively.

A plunger 118 is slidably mounted within the upper housing portion 52 and is provided with a flat head 120 that abuts the valve plunger 72 for controlling its reciprocation in the intermediate housing portion 50. A mechanical link 122 comprising a flexible cable 124 is connected to the housing portion 52 by means of a fitting 126. The cable 124 has a cap 128 on the end to abut with the plunger 118. At the other end of the link 122 a fitting 130 is screw threaded to a collar 132 that is in turn screw threaded to a housing section 134 of the remotely controlled hand operating means 22. The housing section 134 is formed with outwardly turned locking flanges that mate with inwardly turned locking flanges of another housing section 136. Between the juncture of the locking flanges and a snap ring stop 138 in the housing section 136, a plunger 140 having a radial flange 142 is operatively arranged. The upward end of the cable 124 is affixed to the plunger 140 and a spring 144 whose preload may be adjusted by the fitting 130 regulates the position of the flange 142 between the snap ring stop 138 and the locking flanges of the housing sections 134 and 136. A spring 146 on the other side of the plunger 140 also aids in positioning the plunger 140 and also in holding a switch plate 148 that is operable by a button 150 away from the contacts 152 and 154, which contacts are operatively arranged between a storage battery 156 and the solenoid coil 110. The springs 144 and 146 form reaction springs for the operator of the button 150 in controlling the valve 46.

As may be seen in FIGURE 1 the brake pedal 20 is connected to the servomotor 10 by means of a push rod 158. With reference now to FIGURE 2, the push rod 158 is connected to a valve plunger 160 by means of a bearing support 162 in the rearwardly projecting boss 164 of the hub 28 at one end, and by means of a sliding fit between a reaction face 166 of the valve plunger 160 in a plug 168 fitted within the hub 28 at the opposite end. Intermediate these supports the plunger 160 is formed with a rearwardly facing valve seat 170 that cooperates with a sliding poppet 172 to control the communication of passages 174, 176 and 178. The passage 174 is communicated to the checked vacuum supply from the check valve 18 of the servomotors so that in the normal released attitude both sides of the movable wall 24 are suspended in vacuum. In order to communicate the control chamber 34 with the vacuum in the passage 174, the passage 176 opens to a drilled passage 180 in the hub 28 that leads to a fitting 182 to which the rubber hose 30 is connected that in turn leads to the fitting 32. With reference again to FIGURE 2, it is seen that in the normal released attitude the vacuum 174 will be communicated via the passage 176 to the chamber 106 in the valve 46 and through the central opening in the plate 112 to the outlet 42 and thence by the conduit 38 to the control chamber 34. The passage 178, on the other hand, is communicated to atmospheric pressure in that the rearwardly projecting boss 164 is open to atmosphere via vent holes 182 in the rubber boot 184 around the projection 164. In order to maintain this normal released attitude, a valve return spring 186 is installed in a preloaded condition between the guide bearing 162 and the push rod 158, and a valve biasing spring 188 is also installed in a preloaded condition between the hub 28 in the sliding valve 172. This spring 188 is lighter than the spring 186 to effect the released position of poppet 172 and seat 170, as seen in FIGURE 2. Upon relief of spring 186, spring 188 will move the sliding valve 172 against a valve seat 189 formed about an opening in the plug 168 leading to a chamber 190 that is communicated to the passage 176. As may be seen in FIGURE 2, appropriate seals are provided in all of the parts to maintain the integrity of the passages and chambers aforementioned. It should also be noted that a bearing type seal 192 is provided about the opening in the rear housing section of the servomotor 10 for slidably and sealingly supporting the projection 164 passing through the opening.

Before passing on to the operation of the device as illustrated by FIGURES 1 and 2, and before describing the various system modifications of FIGURES 4, 5 and 6, it should be noted that the fitting 130 by regulating the height of the spring 144 may not only position the plunger 140, but will in addition, lower the head 120 of the plunger 118 in the valve 46 to vary the position of the valve plunger 72 within the intermediate housing portion 50 as may be seen with reference to FIGURE 1 by overcoming the spring 86. As the height of the spring 144 is being adjusted by the fitting 130, the poppet 74 will be raised from the seat 78 by the lapping thereonto of the valve plunger 64 until the pressure differential across the diaphragm 54 equals the loading of the spring 68 whereupon the poppet 74 will again return to the seat 78 and the valves will be in the lapped condition, as shown in FIGURE 3. It will thus be apparent that the chamber 92 in the intermediate housing portion 50 will, in contrast to FIGURE 1, have a lesser degree of vacuum than is available at the vacuum inlet 93 for purposes that will be explained with regard to the operation that appears hereinafter.

The operation of the structure and system described with reference to FIGURES 1 and 2 is as follows:

The operator of the servomotor 10 has two means available to him for controlling the same in that he may utilize the brake pedal 20 or the button 150. With reference to the utilization of the brake pedal 20 he will depress the brake pedal to move the push rod 158 inwardly whereupon the sliding valve 172 will follow up the motion of the valve plunger 160 until it seats upon the seat 189, and at this position the valve within the servomotor 10 is in the lapped condition. Further depression of the brake pedal 20 will separate the seat 170 of the valve plunger 160 from the slide valve 172 to open the atmospheric pressure to the passage 176. The atmospheric pressure then will travel via the conduit 40 to the chamber 106 where it passes through the opening in the plate 112 to the outlet 42 and via the conduit 38 to the control chamber 34. This will create a pressure differential across the movable wall 24 and diaphragm 26 to move the movable wall to pressurize the master cylinder 12. If instead of operating the brake pedal 20 the operator chose to push on the button 150, he would immediately feel the reaction spring 146 in closing the switch plate 148 on the contacts 152 and 154. As soon as the contacts 152 and 154 are closed, the coil 110 is energized to pull the core 114 inwardly and seat the disc valve 116 about the central opening in the plate 112 while opening the passage 102 to the passage 107. With the system of FIGURE 1, this will have no immediate effect upon the servomotor 10 in that the chamber 92 of the valve 46 is open by means of passage 66 to the checked vacuum supply so that the movable wall 24 and diaphragm 26 are still suspended in vacuum. Thereafter, further depression of the button 150 which now will be feeling the effect not only of the reaction spring 146 but the reaction spring 144 will cause the cable 124 to push the plunger 118 downwardly to pick up the effect of the spring 86 and translate the valve plunger 72 until the poppet 74 is lapped on the valve plunger 64. At this point, as with the lapping of the slide valve 172 on the seat 170 with the seat 170 also being in contact with the slide valve, the vacuum supply to chamber 34 is terminated. Further depression of the button 150 will cause the poppet 74 to be lifted from the seat 78 by the valve plunger 64 to communicate atmospheric pressure via the passage 80 with the plunger 72 to the chamber 92. Thus atmospheric pressure is communicated to the control chamber 34. At the same time atmospheric pressure is acting on one side of the diaphragm 54 in the valve 46 where vacuum is effective against the other side so that the net effect will be to create a force in opposition to the preload of the spring 68. When this differential becomes great enough the plunger 64 will be lowered so that the poppet 74 is again lapped on both the seat 78 and the valve plunger 64. The spring 68 will serve to hold the lapped condition until either the button 150 is further forced inwardly or released.

With regard now to the modifications of FIGURES 4, 5 and 6, and in particular considering the modification of FIGURE 4 there is shown a position responsive switch 158 placed in the electrical circuitry from the switch 22 and the solenoid within the housing 108. The effect of this switch is to follow up the action of the brake pedal 20 by means of a plunger 160 operatively connected thereto so that upon the depression of the brake pedal 20 switch plate 162 will open contacts 164 and 166 so that the hand operated control means 22 is rendered ineffective for translating the disc valve 116.

With reference to FIGURE 5, a slightly different arrangement is suggested, and it should be noted that the valve 46 will have the plungers 72 and 64 in the condition shown by FIGURE 3 with regard to this modification. More particularly, the position responsive switch 158 is reversed so that the switch plate 162 will close contacts 164 and 166 whenever the brake pedal is depressed. It should also be noted that the contact 164 instead of being placed in series connection between the switch 22 and the solenoid within the housing 108 is now in parallel with the switch 22 and the solenoid and the storage battery 156. There is also provided another position responsive switch 168 having a switch plate 170 cooperating with contacts 172 and 174 with a plunger 176 operatively connected to an accelerator pedal 178 of the vehicle. The switch 168 is in series connection with the switch 158 and the solenoid within the housing 108 so that upon simultaneous depression of the brake pedal 20 and the accelerator pedal 178 a signal is sent to the solenoid to translate the disc valve 116 from the valve seat 104 to the plate 112 about the central opening therethrough. As the plungers 72 and 64 in the system suggested by FIGURE 5 are maintained in the attitude of FIGURE 3 by the adjusting of the fitting 130, a limited pressure differential is created across the wall 24 and diaphragm 26 of the servomotor 10 so that they are translated to create a limited amount of hydraulic pressure in the master cylinder 12 for a controlled deceleration of the associated vehicle.

With reference now to FIGURE 6 there is shown a combination of the systems of FIGURES 4 and 5 by incorporating a dual switching element into the position responsive switch 158 comprised not only of switch plate 162 and contacts 164 and 166, but also with a switch plate 180 and contacts 182 and 194. Again the valve plungers within the valve 46 are suggested to be in the attitude shown by FIGURE 1 by the adjustment of the fitting 130 in the remote control hand operated means 22. Thus it is not only apparent that the means 22 is rendered ineffective upon depression of the brake pedal 20 but that a limited deceleration is afforded the vehicle when simultaneous actuator of the brake pedal and accelerator pedal takes place.

As will be readily understood by those skilled in the art, other adaptations than that which has been specifically depicted herein may well come within the inventive concepts of this invention; and we do not, therefore, intend to be limited by the specific structure described above, but rather by the scope of the appended claims.

We claim:
1. A power brake servomotor comprising:
a housing including a movable wall;
a first valve means for controlling passage means to provide a pressure differential across said movable wall;
an operator-operated control member for said first valve means;
a second valve means operatively connected with said first valve means and said passage means, including means to independently control a pressure differential across said wall; and
an operator-operated control means operatively connected to said second valve means and including means to sequentially cause isolation of tsid first valve means from said passage means and the opening of said second valve means to said passage means and the actuation of said second valve means.

2. A power brake servomotor according to claim 1 wherein said first valve means is characterized as a poppet valve within a valve chamber in the movable wall for controlling communication of first and second passages independently of each other with a third passage leading to another side of said wall than that from which said first passage is communicated with said second passage being normally closed by said poppet valve and in communication with a power source for said servomotor.

3. A power brake servomotor according to claim 2 wherein said second valve means is characterized as including a solenoid valve in a fourth passage communicated with said third passage and a conduit leading to said another side of the wall, said solenoid valve being operatively connected to said operator-operated control means to normally communicate said third passage with said conduit via said fourth passage and when actuated to close said communication and open a pressure source inlet to said conduit.

4. A power brake servomotor according to claim 3 wherein said operator-operated control means includes includes switch means operatively connected to said solenoid valve.

5. A power brake servomotor according to claim 4 wherein said second valve means further includes a manually positionable valve, a pressure responsive valve, spring means for biasing said manually positionable valve means away from said pressure responsive valve and for biasing said pressure responsive valve towards said manually positionable valve, and force transmitting means operatively connecting said manually positionable valve and said operator-operated control means, said manually positionable valve being located in a valve chamber and normally preventing a pressure source from communicating with said pressure source inlet leading from said chamber to said fourth passage and said pressure responsive valve being located also in said chamber and controlling an inlet thereinto by a fluid pressure differing from said pressure source.

6. A power brake servomotor according to claim 5 wherein the operative connection between said switch means and said solenoid valve includes an electrical circuit comprising position responsive switch means operatively connecting said operator-operated control member with said operator-operated control means.

7. A power brake servomotor according to claim 6 and further comprising an accelerator pedal with a second position responsive switch means operatively connected thereto and to said position responsive switch means to energize said solenoid valve and actuate said servomotor whenever said operator-operated control member and said accelerator are being simultaneously acted upon.

8. A power brake servomotor according to claim 7 and wherein the force transmitting means is adjustable in length to permit automatic brake control in accordance with said position responsive switch means.

9. A power brake sermovotor according to claim 6 wherein said position responsive switch means is operatively connecting said operator-operated control member and means until the actuation of said operator-operated control member whereupon said operator-operated control means is rendered ineffective.

10. A power brake servomotor comprising:
a housing including a movable wall;
a first valve means for controlling a pressure differential across said movable wall;
a second valve means operatievly connected with said valve means including means to independently control a pressure differential across said wall while isolating said first valve means from controlling same, said second valve means further including a manually positionable valve, a pressure responsive valve, spring means for biasing said manually positionable valve means away from said pressure responsive valve for biasing said pressure responsive valve towards said manually positionable valve, and force transmitting means operatively connected to said manually positionable valve; and
operator-operated control means for controlling said first valve means and said second valve means.

11. A power brake servomotor comprising:
a housing including a movable wall;
a first valve means for controlling a pressure differential across said movable wall;
an operator-operated control member for said first valve means;
a second valve means in series connection with said first valve means including means to independently control a pressure differential across said wall while isolating said first valve means for controlling same; and
an operator-operated control means electrically and mecanically connected to said second valve means and including means to sequentially cause isolation of said first valve means and the actuation of said second valve means, said connection including an electrical circuit comprising position responsive switch means operatively connecting said operator-operated control member with said operator-operated control means.

12. A power brake servomotor according to claim 10 and further characterized as being in a vehicle control system including an accelerator control which is operatively connected to said operator-operated control means such that said first valve means is isolated and said second valve means is actuated to automatically activate said servomotor whenever simultaneous control signals are imparted to said accelerator control and said operator-operated control means.

References Cited

UNITED STATES PATENTS

| 1,821,200 | 9/1931 | Apple | 188—106 |
| 1,852,286 | 4/1932 | Bragg et al. | 74—481 |
| 1,908,214 | 5/1933 | Arbuckle et al. | 91—20 |
| 2,931,179 | 4/1960 | Mayo | 188—106 |
| 2,931,465 | 4/1960 | Mayo | 188—106 |
| 3,021,821 | 2/1962 | Prather | 91—373 |

FOREIGN PATENTS 523,051  4/1955  Italy.

MARTIN P. SCHWADRON, *Primary Examiner.*

PAUL E. MASLOUSKY, *Examiner.*